Patented May 16, 1950

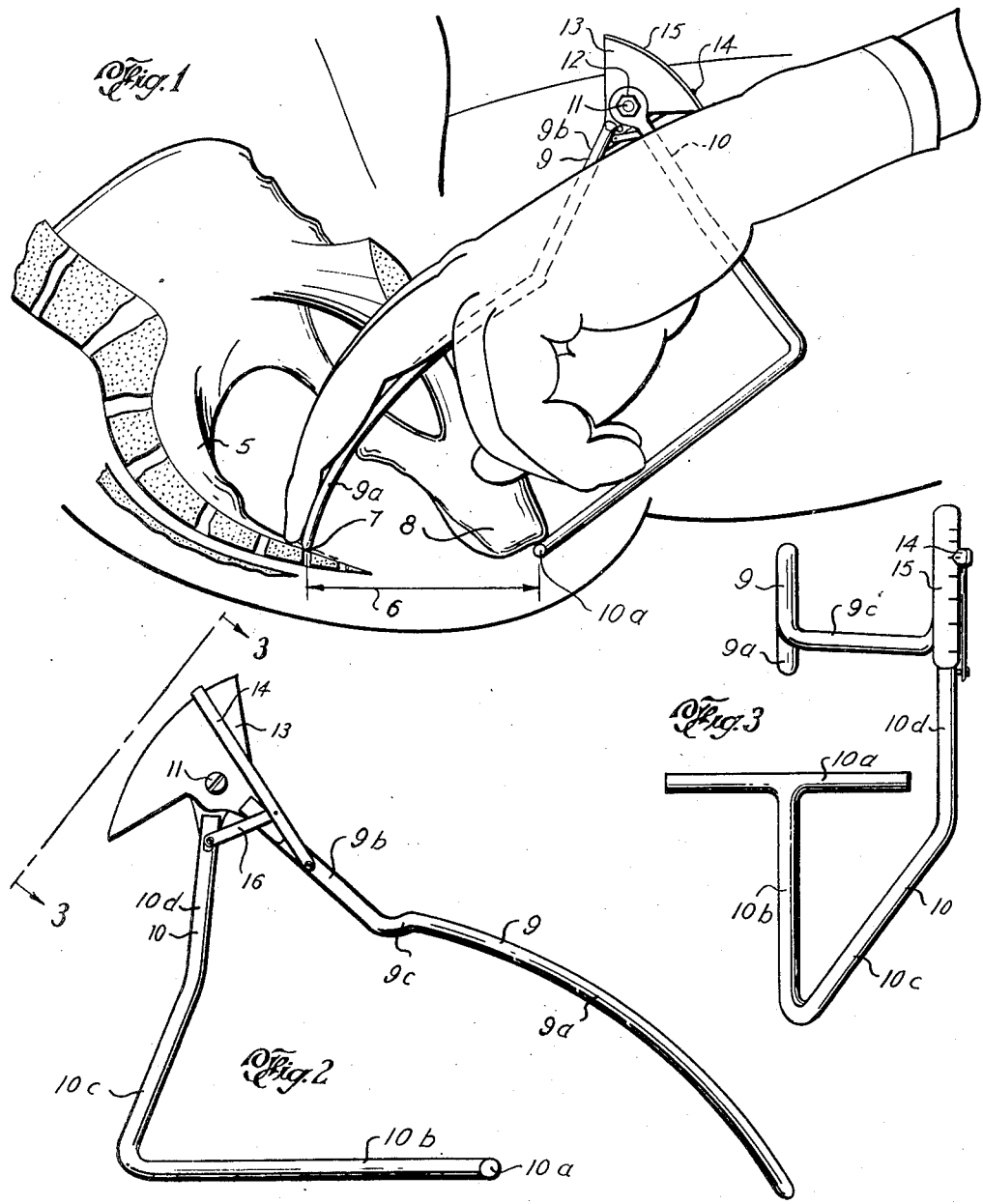

2,507,959

UNITED STATES PATENT OFFICE 2,507,959

DEVICE FOR MEASURING THE POSTERIOR SAGITTAL DIAMETER OF A FEMALE PELVIS

Eugene R. Chapman, San Antonio, Tex.

Application February 7, 1949, Serial No. 75,016

4 Claims. (Cl. 33—148)

This invention relates to improvements in devices for measuring certain diameters of the female pelvis and refers more particularly to the measurement of the posterior sagittal diameter of the pelvis.

When considering questionable pelvic outlet contractions during pre-natal examinations of expectant mothers, the posterior sagittal diameter becomes extremely important since it and the transverse diameter of the outlet will determine if the patient must undergo a Caesarean section or can deliver per vaginum in the normal manner. The posterior sagittal diameter is that distance from the sacro-coccygeal junction or joint to a line drawn through the tuberosities of the ischia. It is the present day practice to take this measurement externally by external palpation. In many instances, this measurement is difficult to make externally for it is hard to locate the sacro-coccygeal joint due to the wide variations in the lateral, forward or backward displacements of the coccyx in different patients. In addition, in some women the thickness of the fat pad makes palpation through it very difficult. In any event, this measurement is not accurate and is at best an estimate for the physician must make some arbitrary allowance for the thickness of the fat and bone for it is the inner surface of the sacro-coccygeal junction which must be reckoned with in estimating whether or not the foetus will pass through this part of the birth canal. The pelvimeters heretofore available may not be used to take the measurement of the posterior sagittal diameter of the pelvis directly from the inner surface of the sacro-coccygeal junction.

An object of this invention is to provide an instrument for measuring directly the distance from the inner surface of the sacro-coccygeal junction to a line between the tuberosities of the ischia.

A further object is to provide a pelvimeter of the character described which may be economically manufactured, is easily used, and gives an accurate measurement of the distance involved.

A still further object is to provide a pelvimeter of the pivoted arm type having two arms formed with special and novel contours which makes it possible to measure directly the posterior sagittal diameter.

Other and further objects of this invention will appear from the description.

In the accompanying drawings which form a part of the instant specification, are to be read in conjunction therewith, and wherein like reference numerals are employed to designate like parts in the various views:

Fig. 1 is a schematic sectional view of a female pelvis illustrating a device constituting an embodiment of this invention in the position relative to the pelvis to give the desired measurement;

Fig. 2 is a side elevation of the pelvimeter shown in Fig. 1 taken from the reverse side of the pelvimeter to that shown in Fig. 1; and Fig. 3 is a view taken along the line 3—3 in Fig. 2 in the direction of the arrows.

Referring to the drawings, and more particularly Fig. 1, a female pelvis is shown schematically at 5 in order to illustrate the purpose and function of the pelvimeter and method of this invention. The diameter or distance to be measured is that shown on the line identified by the numeral 6. This is the distance between the sacro-coccygeal juncture shown at 7 and an imaginary transverse line extending between the tuberosities of the ischia, one of which is shown at 8.

The pelvimeter proper comprises two arms 9 and 10, which have novel contours to be hereinafter more fully described, having a connection which permits relative movement between the parts so as to vary the distance between the free ends of the arms 9 and 10 or between the ends of arms 9 and 10 that are remote from the connection. It has been found preferable, from the standpoint of simplicity and economy of construction, to utilize a pivotal connection between the arms by joining them together with a small bolt or pivot pin 11 and nut 12.

Arm 9 has a curved portion 9a adjacent its free end which presents a concave surface to the free end of arm 9. This portion 9a is shaped to facilitate insertion of the free end of arm 9 into the vagina of a patient with its free end placed upon the tissue just overlying the sacro-coccygeal junction. The tissue overlying this junction is very thin, making the inner surface of the junction easily detectable by the operator. This curved portion also facilitates the orientation of the entire instrument in a caudad or cephalad sense, when taking a measurement, as will be more fully explained in conjunction with the operation.

Arm 9 has a substantially straight portion 9b adjacent its pivoted end which resides within a plane parallel to and spaced from a plane including the arcuate or curved portion 9a. The two portions 9a and 9b are joined together by a third or intermediate portion 9c which extends substantially perpendicularly from the plane including portion 9a. Portion 9b of the arm is spaced laterally from portion 9a in order that the hand of the operator may readily guide the portion 9a into the position shown in Fig. 1 without interference due to the portion 9b because of its lateral or out-of-the-way position. The joining portion 9c preferably is formed with a rather abrupt angle with each of the other portions of the arm. As viewed in Figs. 1 and 2, it is apparent that the free end of arm 9 is not exactly aligned with portion 9b of the arm, were it extended, but that in addition to being laterally spaced therefrom, it is also vertically spaced from such an extension when considered in the plane of the paper in these two figures. This effects a high position of the pivot in operation which aids in the proper orientation of the device to place the free end of arm 10 along the line extending between the tuberosities of the ischia.

Turning now to arm 10, a cross-piece 10a preferably is secured to the free end of the arm to facilitate placement thereof along the line between the tuberosities of the ischia. This may be dispensed with and it is contemplated that the cross-piece may be secured to the device with a removable mounting. However, it is believed that most physicians would prefer the device having the cross-piece in place for it does facilitate the taking the desired measurement.

When viewed in side elevation as in Figs. 1 and 2, arm 10 is formed with a dog-leg like shape which, together with the lateral off-set of the pivot between arms 9 and 10, permits free pivotal movement of arm 10 in operation, without interference of the hand of the operator which is used in guiding arm 9 into proper location. It is believed that this will be well understood by viewing Fig. 1 wherein the hand of the operator is shown to reside within the angle described by the dog-leg like contour of the device. It is, of course, to be understood that the particular contour shown is not required but that the arm should be shaped so as to avoid contact with the hand of the operator which controls arm 9 and it has been found that this contour works entirely satisfactorily. The arm 10, in addition to the cross-piece 10a, includes the portions 10b, 10c and 10d. The portion 10b carries the free end of the arm and extends substantialy perpendicularly from cross-piece 10a. This substantially perpendicular portion 10b facilitates proper placement of the free end of the device in operation as it provides a straight length which will extend perpendicularly from the imaginary line between the tuberosities of the ischia when in proper position. It is for this reason that the dog-leg like contour is preferable to a wide sweeping arc for this purpose.

The portion 10b, of course, resides within a plane which includes the free end of arm 9. Inasmuch as this is laterally displaced from the plane including the pivot, it is necessary to provide portion 10c which extends laterally between the planes and the portion 10d which has a perforate end for receiving pivot pin 11.

In order that the distance between the ends of the device may be readily determined, it is desirable to provide a means which is calibrated to read directly in the desired measurement units. This may be accomplished by forming at the pivot end of arm 9 a quadrant-like member 13 which may be integral to or rigidly attached to arm 9. A linkage is then provided having a pointer 14 which is adapted to move over a scale 15 formed on the quadrant as the two arms are moved about the pivot. This provides a calibrated means associated with the arms of the device adapted to indicate the distance between the two arms. This linkage may include the long pointer arm 14 which is pivoted at one end to one of the arms and another link 16 pivoted to the other of the two arms and to the link at an intermediate point. With this arrangement, the calibrated scale is in ready view in operation and the scale is made to be operative within the usual range of operation of the device. Where the measurement is to be in centimeters, as is the usual case, the scale can, for instance, range between six centimeters and eleven centimeters.

As viewed in Fig. 2, it is readily apparent that the free end of arm 9 is more remote from the pivot than is the free end of arm 10. This difference in the relative displacement of the ends of the two arms provides for insertion of the arm 9 into the position shown in Fig. 1 and proper orientation of arm 10 as shown with the calibrated scale 15 in easy view of an operator.

It is believed that the operation of the device is apparent from the foregoing description. Arm 9 is inserted within the vagina of the patient and its free end is placed on the sacro-coccygeal junction. Then the free end of arm 10 is placed with the cross-piece 10a in proper alignment between the tuberosities of the ischia. The measurement of the distance between the free ends of the arms is then read from the calibrated scale 15, pointer 14 indicating the true distance.

In more detail, the recommended procedure involves the insertion of the middle and index fingers of one hand of the operator into the vagina of the patient. In most pre-natal examinations, this is one of the early steps taken by the physician in order to examine the character of the birth passage and this measurement may be taken at that time. The middle finger is then placed upon the sacro-coccygeal junction and the curved end of arm 9 is inserted into the vagina and guided into position shown in Fig. 1 with its free end at the extremity of the coccyx. Arm 10 is then moved into position between the tuberosities of the ischia, the pivotal connection between the two arms permitting a swinging of arm 10 relative to arm 9 to facilitate its proper orientation. It is often necessary to move the entire instrument caudad or cephalad to allow for the small variation in the horizontal plane of the bi-tuberous diameter in different patients. The curvature of arm 9 is such as to allow for this movement as the arm crosses the perineum. The measurement is then determined by reading the position of the pointer 14 on the calibrated scale 15. The device is then removed and may be cleaned and sterilized.

The device may be fabricated of any suitable rigid materials which lend themselves to the usual methods of sterilization. Stainless steel has been found entirely suitable for this purpose, but it is to be understood that any other suitable material may be used.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter The invention having been described, what is claimed is:

1. A pelvimeter comprising two arms having a pivotal connection, one arm extending in a curve from one end remote from the pivot, the curved portion being formed relative to the pivot so as to reside in a single flat plane as the arm is swung about the pivot, the corresponding end of the second arm being so positioned relative to the pivot that it resides in the same plane as the curved portion of the first arm and is presented to an intermediate part of said curved portion on its concave side as the arms are swung together, and calibrated means connected to the two arms to indicate the distance between said ends of the two arms.

2. A pelvimeter as in claim 1 wherein the second arm is formed with a dog-leg like curved contour with the device viewed in side elevation, the dog-leg like curve being such as to present a concave surface to the first arm.

3. A pelvimeter as in claim 1 wherein the pivotal connection between the arms is spaced laterally from the plane containing the curved portion of the first arm and said end of the second arm, and the second arm is formed with a dog-leg like curved contour with the device viewed in side elevation, the dog-leg like curve being formed so as to present its concave side to the first arm.

4. A pelvimeter as in claim 1 wherein the pivotal connection between the arms is spaced laterally from the plane containing the curved portion of the first arm and said end of the second arm, and the first arm has a portion intermediate the pivot and the curved portion and adjacent the curved portion, which extends abruptly laterally to a plane containing the pivot, which plane is parallel to said plane containing said ends of the arms.

EUGENE R. CHAPMAN.

REFERENCES CITED

The following references are of record in the file of this patent:

UNITED STATES PATENTS

| Number | Name | Date |
| --- | --- | --- |
| 1,804,064 | Sison | May 5, 1931 |
| 1,856,295 | Sovatkin | May 3, 1932 |
| 1,953,498 | Pieri et al. | Apr. 3, 1934 |
| 2,148,649 | Scholl | Feb. 28, 1939 |
| 2,456,806 | Wolffe | Dec. 21, 1948 |